United States Patent
Kao

[11] Patent Number: 5,295,727
[45] Date of Patent: Mar. 22, 1994

[54] BICYCLE SEAT ADJUSTING DEVICE
[76] Inventor: Yu-Chien Kao, 2, Alley 1, Lane 29, Sec. 2, Pei-Shin Rd., Shin-Tien City, Taipei Hsien, Taiwan
[21] Appl. No.: 868,221
[22] Filed: Apr. 14, 1992
[51] Int. Cl.⁵ .............................................. B62J 1/00
[52] U.S. Cl. ........................... 297/215.14; 2248/180; 403/391
[58] Field of Search ................ 297/195; 403/390, 391, 403/396; 248/180, 291

[56]  References Cited
U.S. PATENT DOCUMENTS

| | | | |
|---|---|---|---|
| 4,369,999 | 1/1983 | Kashima | 297/195 |
| 4,836,604 | 6/1989 | Romano | 297/195 |
| 4,995,753 | 2/1991 | Shook | 297/195 X |
| 5,033,790 | 7/1991 | Schilplin et al. | 297/195 |
| 5,190,346 | 3/1993 | Ringle | 403/391 X |

FOREIGN PATENT DOCUMENTS
607187 8/1960 Italy ................................. 297/195

Primary Examiner—Michael F. Trettel
Attorney, Agent, or Firm—Bacon & Thomas

[57] ABSTRACT

A bicycle seat adjusting device, particularly a device to adjust the seat forward or backward and to adjust its inclination degree, comprising an adjusting shaft placed within an U-shaped support at the upper end of seat post so that the adjusting shaft can be locked by two retainers on opposite sides. The adjusting shaft is designed with radial positioning holes for fitting an adjusting lever so that turning of the adjusting lever can tighten or loosen the retainers for fitting or adjusting of the seat to a desired position.

6 Claims, 2 Drawing Sheets

BICYCLE SEAT ADJUSTING DEVICE

BACKGROUND OF THE INVENTION (a) Field of the Invention

The present invention relates to a bicycle seat adjusting device, and particularly a device to displace a bicycle seat forward and backward and adjust its inclination angle.

(b) Description of the Prior Art

Conventionally seat and, the seat post of a bicycle are connected together by means of a retainer at each side of the seat post to position metal supports beneath the seat which are then secured thereto by means of bolts and nuts. Such a structure requires a number of parts. The structure is complicated, and its assembly is not easy. Moreover, the location and inclination of the seat cannot be easily adjusted by its user.

SUMMARY OF THE INVENTION

The main object of the present invention is to provide a bicycle seat adjusting device having an adjusting shaft to simultaneously tighten or loosen two side retainers. The adjustment is thus very easy, and convenient because turning of the adjusting shaft permits moving the seat forward or backward or adjust its inclination to meet the need for riding on different road conditions.

Another object of the present invention is to provide a bicycle seat adjusting device having an U-shaped support at the top the seat post for holding of a retainer at each side to secure a metal support beneath the seat so that the retainer at each side firmly secures the seat to simplify assembly of the seat.

DETAILED DESCRIPTION OF THE EMBODIMENTS

Figure 1:
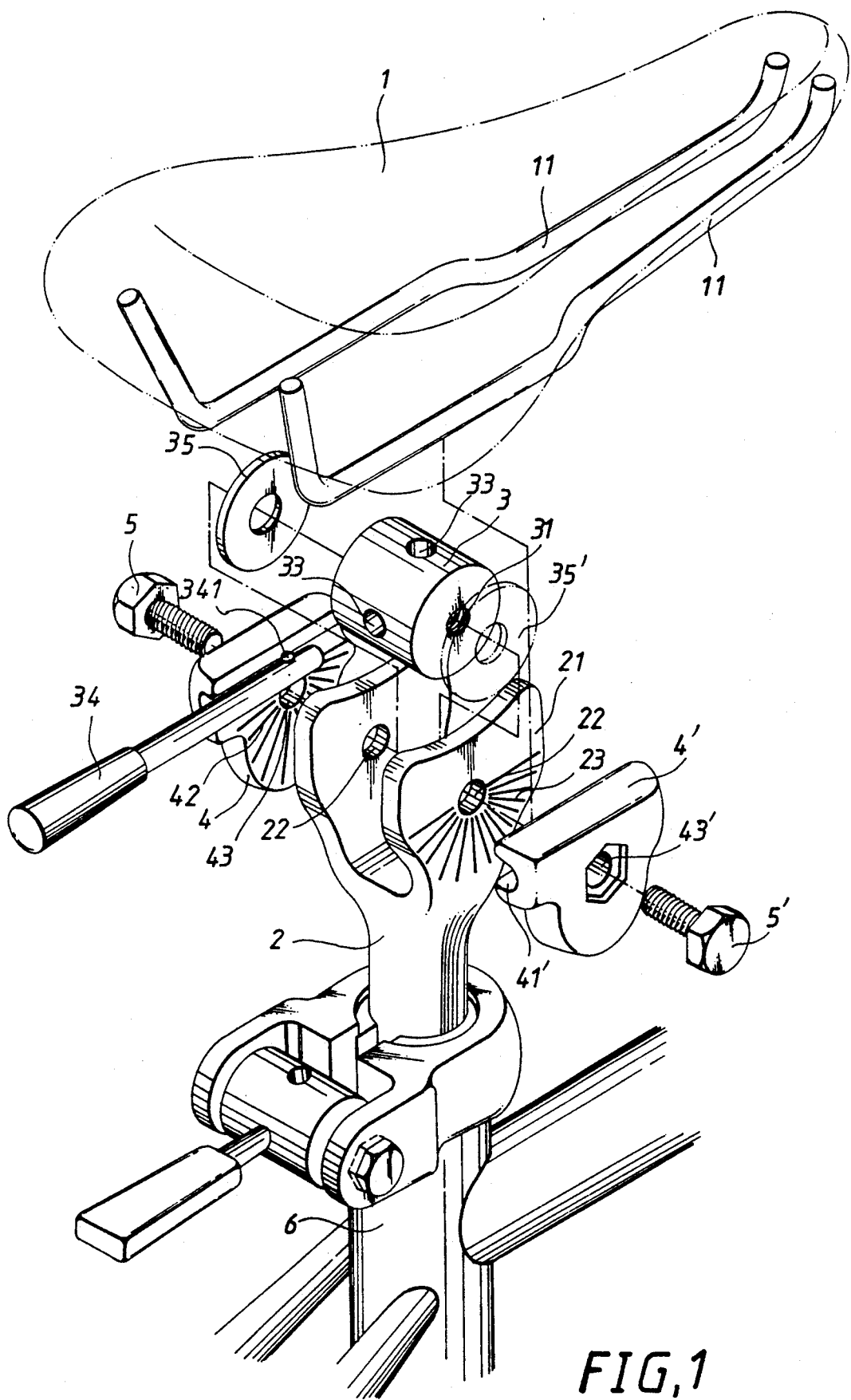
FIG. 1 is a perspective exploded view of a bicycle seat adjusting device according to the present invention.

As shown in FIG. 1, the bicycle seat adjusting device according to the present invention comprises mainly a seat (1), a seat post (2), an adjusting shaft (3) and two retainers (4 and 4').

The seat (1) is a conventional seat for a bicycle, and has two metal supports (11 and 11') extended from its bottom.

The seat post (2) is inserted into a bicycle frame (6) for installation of the seat (1). It has an U-shaped support (21) at the top. Each side wall of the U-shaped support (21) has a central hole (22) corresponding to another central hole (22) at the other side wall. The surface of each side wall is designed with appropriate sliding-proof ribs (23) extending radially.

The adjusting shaft (3) is in the form of a cylinder with a screw hole (31 or 32) at the center of each end face designed in a manner that the threads in these two screw holes (31 and 32) are in opposite directions. It has a plurality of radial positioning holes (33) formed perpendicular to its axis so that any radial positioning hole (33) can be selected to fix an adjusting level (34) having a retractable stop ball (341) on a cylindrical wall of its front end so that the adjusting lever (34) can be seized in the radial positioning hole (33) by the stop ball (341).

The retainers (4 and 4') are two symmetrical structures, each has an arched slot (41 or 41') on an inner side, a plurality of sliding proof ribs (42) extending radially on an inner wall, and a hexagonal hole (43 or 43') at an outer wall.

Figure 2:
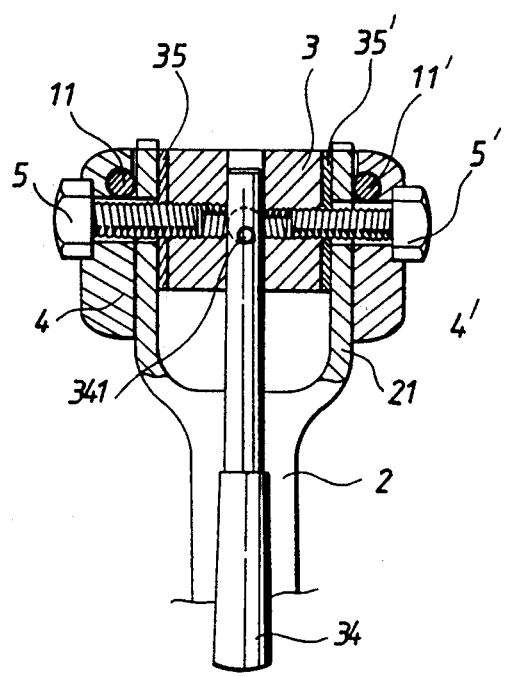
FIG. 2 is a sectional view of the bicycle seat adjusting device according to the present invention.

With the above structures, the adjusting shaft (3) is placed within the U-shaped support (21) at the upper end of the seat post (2), and then the two hexagonal bolts (5 and 5'), each at a retainer (4 or 4') are inserted through the respective hexagonal holes (43 and 43') to the respective central holes (22) passing through the U-shaped support (21) for locking the adjusting shaft (31) by tightening at the screw holes (31 and 32). The retainers (4 and 4') are designed for fitting by the metal supports (11 and 11') of the seat (1) as shown in FIG. 2, hence, when the hexagonal bolts (5 and 5') are tightened, the seat is fixed at a certain position. To adjust the position of the seat, only the adjusting lever (34) has to be turned in order to loosen the hexagonal bolts (5 and 5') and consequently to loosen the seat (1), and then the seat (1) can be adjusted to any desired position. Finally, by tightening the adjusting lever (34), the seat (1) can be fixed at the desired position. Therefore, the adjustment is easy and convenient, and the seat can be adjusted to any position desired.

An annular gasket (35 or 35') can be additionally installed at each side of the said adjusting shaft (3). It is placed between the adjusting shaft (3) and a retainer (4 or 4') to assure a tight locking effect by the said hexagonal bolts (5 and 5').

Figure 3:
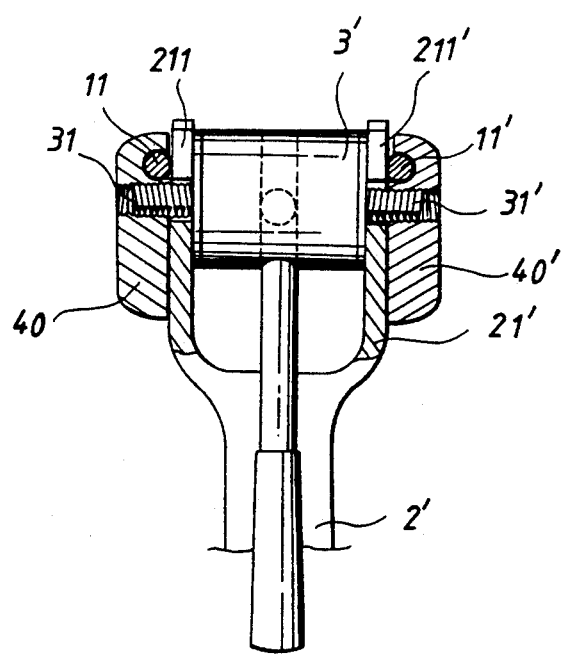
FIG. 3 is a sectional view of another embodiment of the present invention.

Many changes and modifications in the above described embodiment of the invention can, of course, be carried out without departing from the spirit thereof. As shown in FIG. 3, the adjusting shaft (3') is designed with two screw rods (31') each extending directly from an end, and the U-shaped support (21') at the top of the seat post (2') is designed with corresponding openings (211') so that the adjusting shaft (3') can be turned directly to cause the screw rods (31') to lock the retainers (40) and then a desired radial positioning hole is selected to fix the seat at a desired position.

The main purpose of the present invention is to provide an adjusting device which can be locked and loosened easily, and it can be used for fixing of any seat in addition to bicycle seat. It can be used to fix other support or frame of any bicycle, for example. As shown in FIG. 1, it can be used to fix the seat post (2) and bicycle frame (6), structure of which is same with that described above, and will not be repeated here. Accordingly, to promote the progress in science and the useful arts, the invention is disclosed and is intended to be limited only by the scope of the appended claims.

I claim:

1. An adjusting device for a bicycle seat of the type having a pair of bottom supports comprising:
   (a) a seat post including a pair of spaced sidewalls defining a U-shaped configuration, each sidewall including an outer side, a central hole extending through the sidewall and a plurality of first ribs extending radially from the central hole on the outer side;
   (b) a cylindrical-shaped adjusting shaft disposed between the sidewalls and including first and second oppositely threaded holes extending inwardly from opposite ends of the shaft and a plurality of spaced positioning holes extending radially outwardly from a central axis of the shaft;

(c) a pair of retainers, each retainer including a retaining hole therethrough, an inner side, a slot for engaging a bottom support of a bicycle seat and a plurality of second ribs extending radially outwardly from the retaining hole on the inner side;

(d) first and second oppositely threaded members, the first threaded member extending through one retainer hole, one central hole and threadedly engaged within the first threaded hole, and the second threaded member extending through the other retainer hole, the other central hole and threadedly engaged within the second threaded hole; and (e) an adjusting lever selectively engageable within any of the plurality of positioning holes for rotating the adjusting shaft and tightening or loosening the retainers with respect to the bottom supports of the bicycle seat to permit adjusting the seat to a desired position and securing the seat in such position.

2. The adjusting device of claim 1 wherein the first and second threaded members each includes a bolt.

3. The adjusting device of claim 1 wherein:
(a) the retainer holes are oppositely threaded; and
(b) the first and second threaded members include a pair of threaded rods.

4. The adjusting device of claim 1 wherein the adjusting lever includes a retractable ball for securing the lever in a selected positioning hole.

5. The adjusting device of claim 1 further including an annular gasket disposed on each side of the adjusting shaft.

6. An adjusting device for compressing a U-shaped bracket defined by a pair of sidewalls, each sidewall including a central hole therethrough, which device comprises:

(a) a cylindrical-shaped adjusting shaft receivable between the sidewalls of the bracket and including first and second oppositely threaded holes extending inwardly from opposite ends of the shaft and a plurality of spaced positioning holes extending radially outwardly from a central axis of the shaft;

(b) a pair of first and second oppositely threaded members extending through the central holes of the sidewalls and threadedly engaged within the respective first and second oppositely threaded holes of the adjusting shaft; and (c) an adjusting lever selectively engageable within any of the plurality of positioning holes for rotating the adjusting shaft to compress the sidewalls towards the ends of the shaft or extend the sidewalls away from the ends of the shaft, for respectively tightening or loosening the bracket around a member.

* * * * *